(12) United States Patent
Liu et al.

(10) Patent No.: US 12,556,780 B2
(45) Date of Patent: Feb. 17, 2026

(54) LIVE VIDEO PROCESSING METHOD AND APPARATUS, DEVICE AND MEDIUM

(71) Applicant: Beijing Zitiao Network Technology Co., Ltd., Beijing (CN)

(72) Inventors: Yan Liu, Beijing (CN); Zixin Yong, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 105 days.

(21) Appl. No.: 18/454,590

(22) Filed: Aug. 23, 2023

(65) Prior Publication Data

US 2024/0073488 A1    Feb. 29, 2024

(30) Foreign Application Priority Data

Aug. 23, 2022  (CN) .......................... 202211014041.7

(51) Int. Cl.
*H04N 21/81* (2011.01)
*H04N 21/2187* (2011.01)
*H04N 21/431* (2011.01)
*H04N 21/472* (2011.01)

(52) U.S. Cl.
CPC ..... *H04N 21/8146* (2013.01); *H04N 21/2187* (2013.01); *H04N 21/4314* (2013.01); *H04N 21/4318* (2013.01); *H04N 21/47205* (2013.01)

(58) Field of Classification Search
None
See application file for complete search history.

(56) References Cited

U.S. PATENT DOCUMENTS

| | | |
|---|---|---|
| 2018/0018319 A1 | 1/2018 | He |
| 2020/0177823 A1 | 6/2020 | Zhu et al. |
| 2022/0395749 A1 | 12/2022 | Han |
| 2023/0011255 A1 | 1/2023 | Tang et al. |
| 2023/0344662 A1* | 10/2023 | Banks ................. H04L 12/1822 |
| 2024/0061898 A1* | 2/2024 | Anvaripour ....... H04M 1/72469 |
| 2024/0094865 A1* | 3/2024 | Stolzenberg ........ G06F 3/04883 |

FOREIGN PATENT DOCUMENTS

| | | |
|---|---|---|
| CN | 106303354 A | 1/2017 |
| CN | 109104586 A | 12/2018 |
| CN | 109391792 A | 2/2019 |
| CN | 109729374 A | 5/2019 |
| CN | 113038287 A | 6/2021 |
| CN | 113411624 A | 9/2021 |
| CN | 113542902 A | 10/2021 |
| CN | 113573092 A | 10/2021 |
| CN | 114466213 A | 5/2022 |
| WO | 2022028151 A1 | 2/2022 |

* cited by examiner

*Primary Examiner* — Omar S Parra
(74) *Attorney, Agent, or Firm* — Alleman Hall LLP

(57) ABSTRACT

A live video processing method and apparatus, a device and a medium are provided. A first display image corresponding to a first user and a second display image corresponding to a second user are displayed on a live streaming room interface corresponding to the first user. If the second display image is provided with a first special effect image, a first special effect identification associated with the first special effect image is displayed on the live streaming room interface. The first special effect image is displayed on the first display image in response to a triggering operation of the first user on the first special effect identification.

19 Claims, 8 Drawing Sheets

LIVE VIDEO PROCESSING METHOD AND APPARATUS, DEVICE AND MEDIUM

CROSS-REFERENCE TO RELATED APPLICATIONS

This application claims priority to Chinese application NO. 202211014041.7, titled "LIVE VIDEO PROCESSING METHOD AND APPARATUS, DEVICE AND MEDIUM", filed Aug. 23, 2022, with the China National Intellectual Property Administration, which is incorporated herein by reference in its entirety.

TECHNICAL FIELD

The present disclosure relates to the field of computer technology, and in particular to a live video processing method and apparatus, a device and a medium.

BACKGROUND

With the continuous development of live streaming technology, more and more users socialize through live streaming. During the live streaming, users may introduce special effects to increase the fun of the live streaming room, so as to attract more viewers. Furthermore, popularity may also be improved by co-hosting, link for interaction, or PK. In this case, if a user wants to use special effects used by an interacting user, complicated operations are required before the user can use the same special effects, which affects the user experience.

SUMMARY

In view of this, a live video processing method and apparatus, a device and a medium are provided according to embodiments of the present disclosure.

In order to achieve the above object, the following technical solutions are provided according to the present disclosure.

In a first aspect of the present disclosure, a live video processing method is provided. The method includes:
 displaying a live streaming room interface, the live streaming room interface including a first display image corresponding to a first user and a second display image corresponding to a second user;
 in response to the second display image being provided with a first special effect image, displaying, on the live streaming room interface, a first special effect identification associated with the first special effect image; and
 displaying the first special effect image on the first display image in response to a triggering operation of the first user on the first special effect identification.

In the second aspect of the present disclosure, a live video processing apparatus is provided. The live video processing apparatus includes:
 a first display unit configured to display a live streaming room interface, the live streaming room interface including a first display image corresponding to a first user and a second display image corresponding to a second user;
 a second display unit configured to, in response to the second display image being provided with a first special effect image, display on the live streaming room interface, a first special effect identification of a first special effect image; and
 a third display unit configured to display the first special effect image on the first display image in response to a triggering operation of the first user on the first special effect identification.

In the third aspect of the present application, an electronic device is provided. The electronic device includes a processor and a memory.

The memory is configured to store instructions or computer programs.

The processor is configured to execute the instructions or the computer programs in the memory, to cause the electronic device to perform the method according to the first aspect.

In the fourth aspect of the present disclosure, a computer-readable storage medium is provided. The computer-readable storage medium stores instructions. The instructions, when executed on a device, cause the device to perform the method according to the first aspect.

In the fifth aspect of the present application, a computer program product is provided. The computer program product includes computer programs/instructions. The computer programs/instructions, when executed by a processor, implement the method according to the first aspect.

It can be seen that the embodiments of the present disclosure have following advantages.

In embodiments of the present disclosure, a first display image corresponding to a first user and a second display image corresponding to a second user are displayed on a live streaming room interface of the first user. If the second display image is provided with a first special effect image, a first special effect identification associated with the first special effect image is displayed on the live streaming room interface of the first user. The first special effect image is displayed on the first display image in response to a triggering operation of the first user on the first special effect identification. That is, by displaying the first special effect identification associated with the first special effect image on the live streaming room interface of the first user, the first user is provided with a quick access to reuse the first special effect image.

BRIEF DESCRIPTION OF THE DRAWINGS

In order to more clearly illustrate technical solutions in the embodiments of the present disclosure or in the conventional technology, the drawings to be used in the description of the embodiments or in the conventional technology are briefly described below. Apparently, the drawings in the following description show only some embodiments of the present disclosure, and other drawings may be obtained by those skilled in the art from the drawings without any creative work.

DETAILED DESCRIPTION OF THE EMBODIMENTS

In order to understand the solutions of the present disclosure better by those skilled in the art, the technical solutions of embodiments of the present disclosure are clearly and completely described below in conjunction with the drawings of the embodiments of the present disclosure. Apparently, the embodiments described below are only some embodiments of the present disclosure, rather than all the embodiments. All the other embodiments obtained by those skilled in the art based on the embodiments in the present disclosure without any creative work fall into the scope of the present disclosure.

At present, in a scenario of co-hosting, when one of hosts wants to use a special effect image used by a co-hosting user, multiple operations are required to be triggered in a live streaming room interface to call a special effect panel and then click on the special effect image used by the co-hosting user in the special effect panel, in order to achieve reuse of the special effect. This reuse method has a long reuse path, which affects the user experience. The co-hosting in the live streaming may include co-hosting between different hosts, or co-hosting between a host and an audience in a live streaming room.

Figure 1:
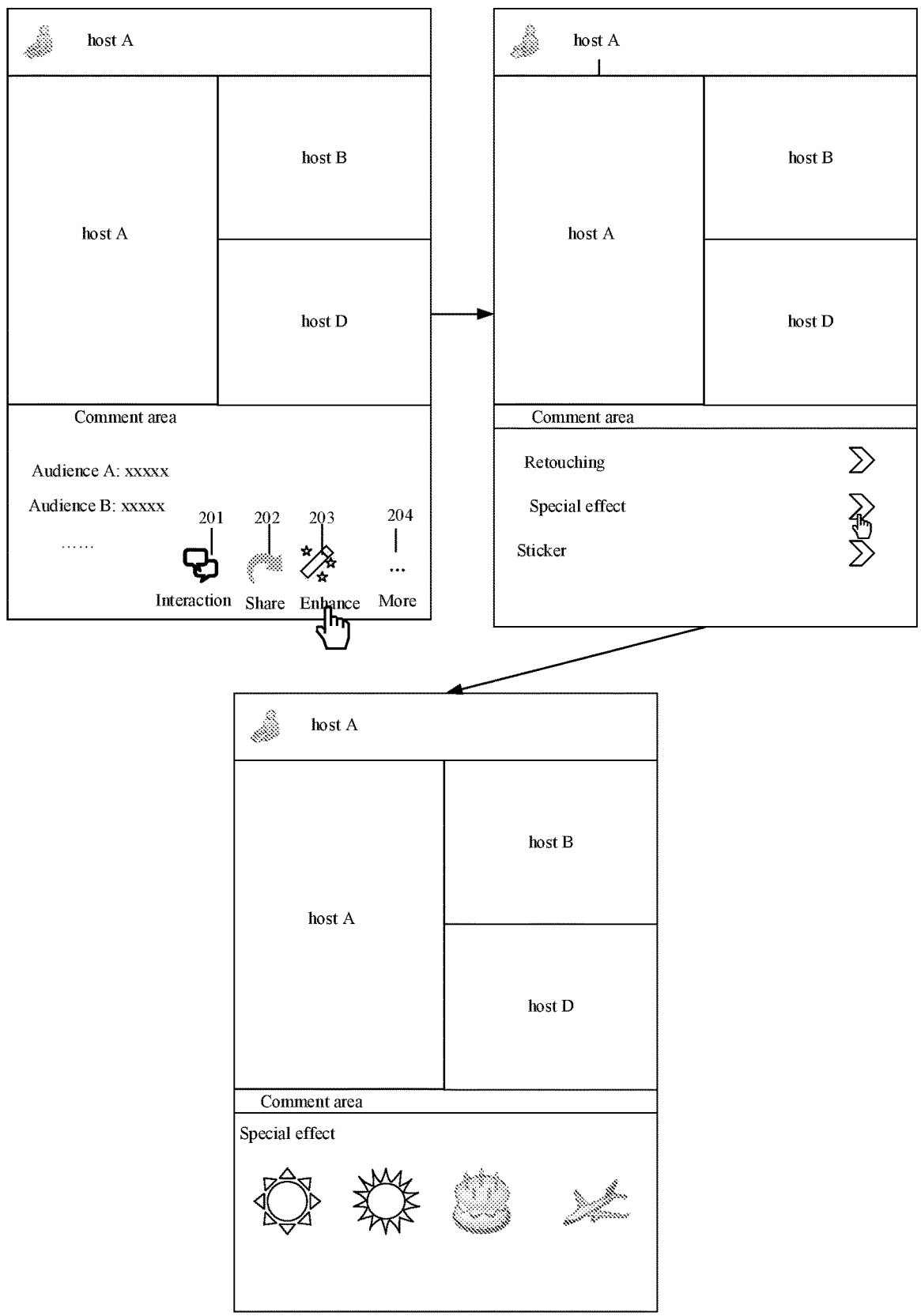
FIG. 1 is a schematic diagram displaying a special effect panel provided according to an embodiment of the present disclosure.

For example, in the scenario of a live streaming room interface shown in FIG. 1, illustration is made by taking the case of multiple hosts co-hosting as an example. There are three hosts in the live streaming room, and the description is exemplarily made from the view of host A. A navigation bar is displayed at the bottom of a live streaming room interface of host A. The navigation bar includes an interactive control 201, a sharing control 202, an enhancement control 203 and a "more" control 204. The interactive control 201 is used for the interaction between host A and audiences in the live streaming room, the sharing control 202 is used for host A to share the current live streaming room to other users, the enhancement control 203 is used for enhancement processing of the display image of the current host A, and the "more" control 204 is used to display more functional controls that may be triggered in response to a triggering operation of host A. It can be seen from FIG. 1 that in a case that host A wants to reuse a special effect image, first the enhancement control 203 is clicked to display an enhancement panel. The enhancement panel includes a retouching control, a special effect control and a sticker control. The special effect panel is displayed in response to the triggering on the special effect control by host A. The special effect panel includes various special effect identifications. Host A needs to click a special effect identification (for example, a special effect identification of a special effect image used by Host B) to trigger the use of the special effect image corresponding to the special effect identification. It can be seen that the path for host A to reuse a special effect image is long, which affects the use experience.

Based on this, a live video processing method is provided according to the present disclosure. The method includes: displaying a live streaming room interface of a first user, the live streaming room interface including a first display image of the first user and a second display image corresponding to a second user. In response to the second display image being provided with a first special effect image, a first special effect identification associated with the first special effect image is displayed on the live streaming room interface of the first user. The first special effect identification provides the first user with an access to quickly use the first special effect image. The first special effect image is displayed on the first display image in response to the triggering operation of the first user on the first special effect identification. That is, in the present disclosure, by displaying the first special effect identification on the live streaming room interface of the first user, the first user is provided with an access to quickly use the first special effect image, so that the first special effect image is displayed on the first display image by the first user triggering the first special effect identification, which improves the user experience.

For better understanding, the technical solution provided in the embodiments of the present disclosure will be described below in conjunction with the accompanying drawings. The display of a live streaming room interface is described below exemplarily from the perspective of the first user in the live streaming room.

Figure 2:
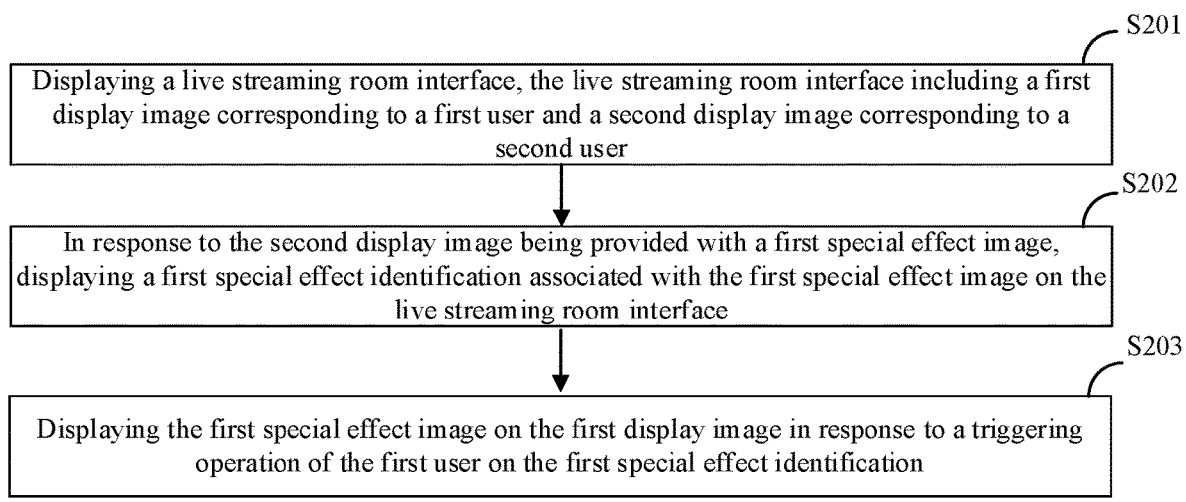
FIG. 2 is a flowchart of a live video processing method provided according to an embodiment of the present disclosure.

Referring to FIG. 2, a live video processing method is provided according to an embodiment of the present disclosure. The method may be performed by a live streaming client, and the live streaming client is a live streaming client of the first user and may be installed in an electronic device. The electronic device may include devices with communication functions, such as mobile phones, tablets, notebooks, desktops, vehicle terminals, wearable electronic devices, all-in-one computers, smart home devices and the like, or may be virtual machines or devices simulated by a simulator. As shown in FIG. 2, the method may include steps S201 to S203.

In S201: a live streaming room interface is displayed, and the live streaming room interface includes a first display image corresponding to a first user and a second display image corresponding to a second user.

In this embodiment, when the first user and the second user initiate co-hosting in the live streaming room, the live streaming room interface including the first display image of the first user and the second display image of the second user is displayed.

The live streaming room interface may be a co-hosting live streaming room interface. The first user and the second user are users participating in co-hosting. The first user may be a host or a guest in the live streaming room, who may be an initiator/inviter of the co-hosting, or the invitee of the co-hosting. Similarly, the second user may be a host or a guest in the live streaming room, who may be an initiator of the co-hosting, or an invitee of the co-hosting. In the case that the first user is the inviter of the co-hosting, the second user is the invitee of the co-hosting. A scenario of co-hosting by hosts is described below. It is described by taking the first user being an inviter of the interaction and the second/third/fourth/fifth user being the invitee of the interaction as an example.

In S202: in response to the second display image being provided with a first special effect image, a first special effect identification associated with the first special effect image is displayed on a live streaming room interface.

In this embodiment, when the second user triggers the use of the first special effect image through a live streaming room interface of the second user, the first special effect image is displayed on the second display image. When it is detected that the first special effect image is displayed on the second display image, the first special effect identification associated with the first special effect image is displayed on the live streaming room interface. It should be noted that in a case that the first user does not use the first special effect image, the first special effect identification associated with the first special effect image is displayed on the live streaming room interface of the first user.

Displaying the first special effect identification on the live streaming room interface may include displaying the first special effect identification on a navigation bar of the live streaming room interface. Further, the first special effect identification may be displayed on a first control displayed in the navigation bar. The first control is used to perform enhancement processing on the first display image, and the enhancement processing may include one or more of retouching, filter and special effect processing. Specifically, the first control is displayed on the live streaming room interface, and the first special effect identification is displayed on the first control in response to the second display image being provided with the first special effect image. The first control includes an access to a special effect panel.

Figure 3A:
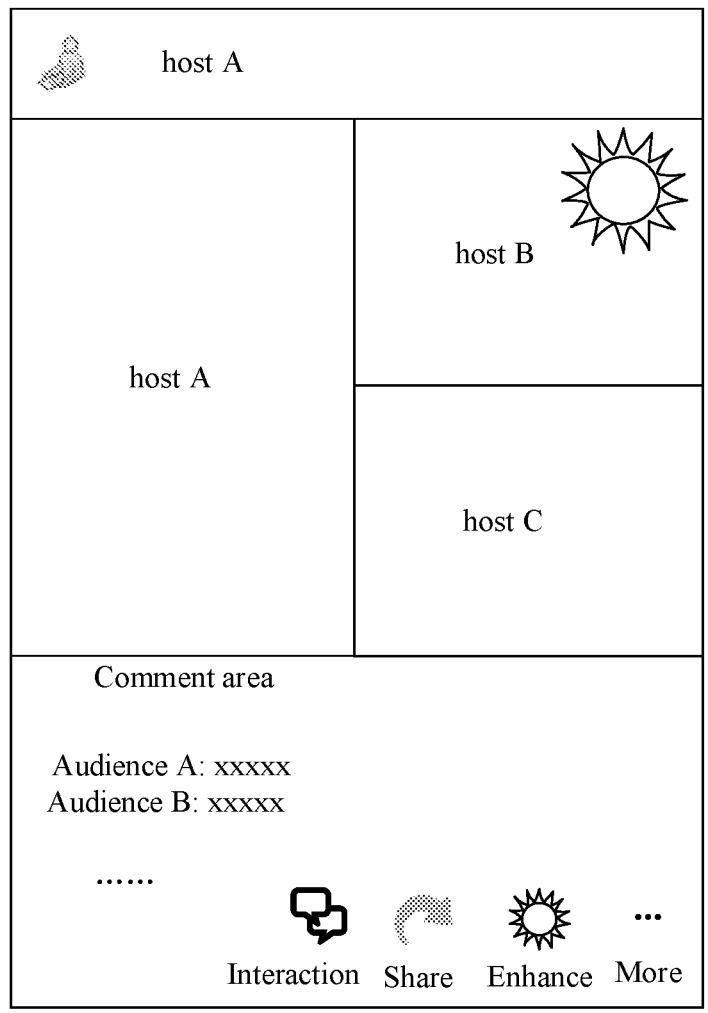
FIG. 3a is a schematic diagram for displaying a first special effect identification on a live streaming room interface provided according to an embodiment of the present disclosure.

For example, as shown in FIG. 3a, if host B in the live streaming room uses a special effect and the display image of the host B is provided with a special effect image, a special effect identification associated with the special effect image is displayed on the first control (the enhancement control). Therefore, host A is provided with an access to quickly use the special effect image.

Figure 3B:
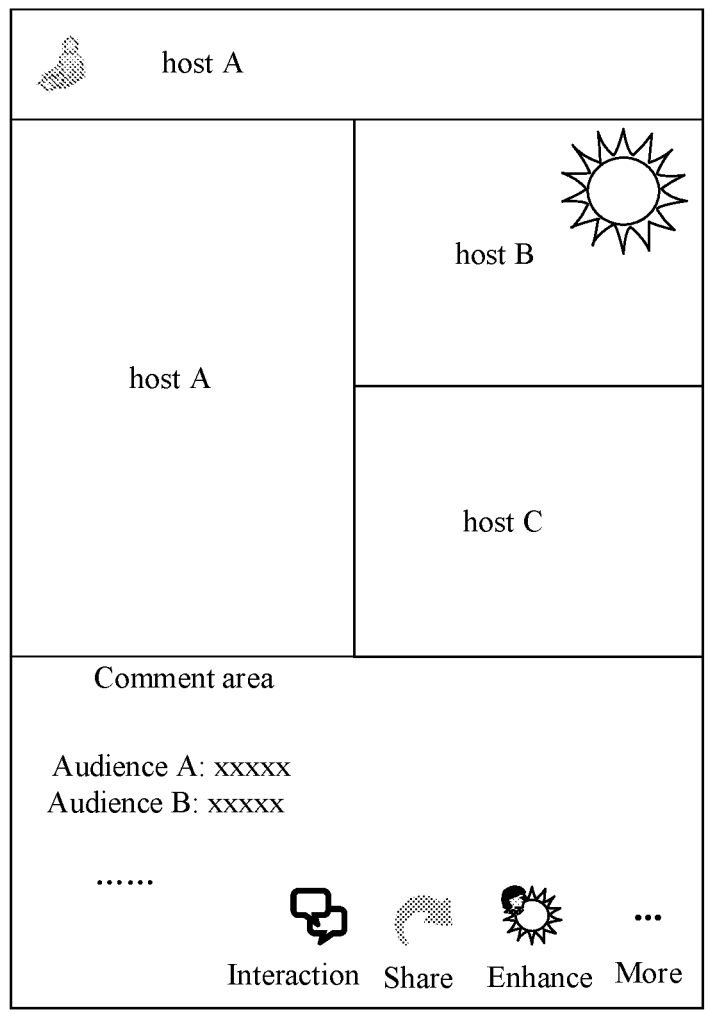
FIG. 3b is a schematic diagram of displaying a user identification on a first special effect identification provided according to an embodiment of the present disclosure.

In some embodiments, in order to enable the first user to intuitively and clearly know which user is using the special effect identification displayed on the live streaming room interface, a user identification of the second user may also be displayed on the first special effect identification displayed on the live streaming room interface of the first user. The user identification may be an avatar of the second user, a thumbnail of the second display image, a nickname, or the like. For example, in a display effect diagram shown in FIG. 3b, an avatar of host B is displayed on the special effect identification. A display position of the user identification on the first special effect identification may be set according to the actual application. For example, as shown in FIG. 3b, the avatar of host B is displayed on the upper left corner of the first special effect identification.

In some embodiments, when it is detected that the second display image is provided with the first special effect image, the duration for displaying the first special effect image on the second display image may be counted. If the duration is greater than or equal to a second preset duration, the first special effect identification is displayed on the live streaming room interface of the first user, and thus the stability of information displayed on the live streaming room interface is ensured. For example, in the case that the second preset duration is 10 seconds, if the second user uses the first special effect image for more than 10 seconds, the first special effect identification is displayed on the live streaming room interface of the first user.

It should be noted that the first special effect identification is an identification associated with the first special effect.

The first special effect identification may be displayed in different places in different embodiments, for example, may be displayed in the live streaming room interface, on the first control, in the navigation bar, in the special effect panel, or the like. In this disclosure, any one of the special effect identifications associated with the first special effect, no matter where it is displayed, is referred to as the first special effect identification.

In S203: the first special effect image is displayed on the first display image in response to a triggering operation of the first user on the first special effect identification.

In this embodiment, when the first user triggers the first special effect identification displayed on the live streaming room interface, the first special effect image is displayed on the first display image. That is, the first user is provided with an access to quickly use the first special effect image through the first special effect identification.

It can be seen that in the case that the live streaming room interface displays the first display image of the first user and the second display image of the second user and the second display image is provided with the first special effect image, the first special effect identification associated with the first special effect image is displayed on the live streaming room interface of the first user. The first special effect image is displayed on the first display image in response to the triggering operation of the first user on the first special effect identification. That is, by displaying the first special effect identification associated with the first special effect image on the live streaming room interface of the first user, the first user is provided with a quick access to reuse the first special effect image without tedious operations of the first user, improving the user experience. In addition, it is conducive to improving the interactive atmosphere in a scenario of co-hosting, especially PK scenario, of multiple users, since the users can quickly use multiple identical special effect images to enrich the interaction in the live streaming room.

Displaying the first special effect image on the first display image based on the triggering operation of the first user on the first special effect identification may be achieved as follows.

In an implementation, the first special effect image is displayed on the first display image in response to a click operation of the first user on the first special effect identification. That is, once the click operation of the first user on the first special effect identification is detected, it indicates that the first user wants to use the first special effect image, and the first special effect image is added to the first display image.

In another implementation, a special effect panel is displayed in response to the triggering operation of the first user on the first special effect identification, and the special effect panel includes the first special effect identification; and the first special effect image is displayed on the first display image in response to the triggering operation of the first user on the first special effect identification on the special effect panel. That is, when the triggering operation of the first user on the first special effect identification displayed on the live streaming room interface is detected, the special effect panel is called up, and the first user triggers a confirmation operation with respect to the first special effect identification on the special effect panel, to display the first special effect image on the first display image. That is, a way to quickly call up the special effect panel is provided according to this embodiment provides, so that the first user may quickly reuse the first special effect image, improving the use experience.

Figure 3C:
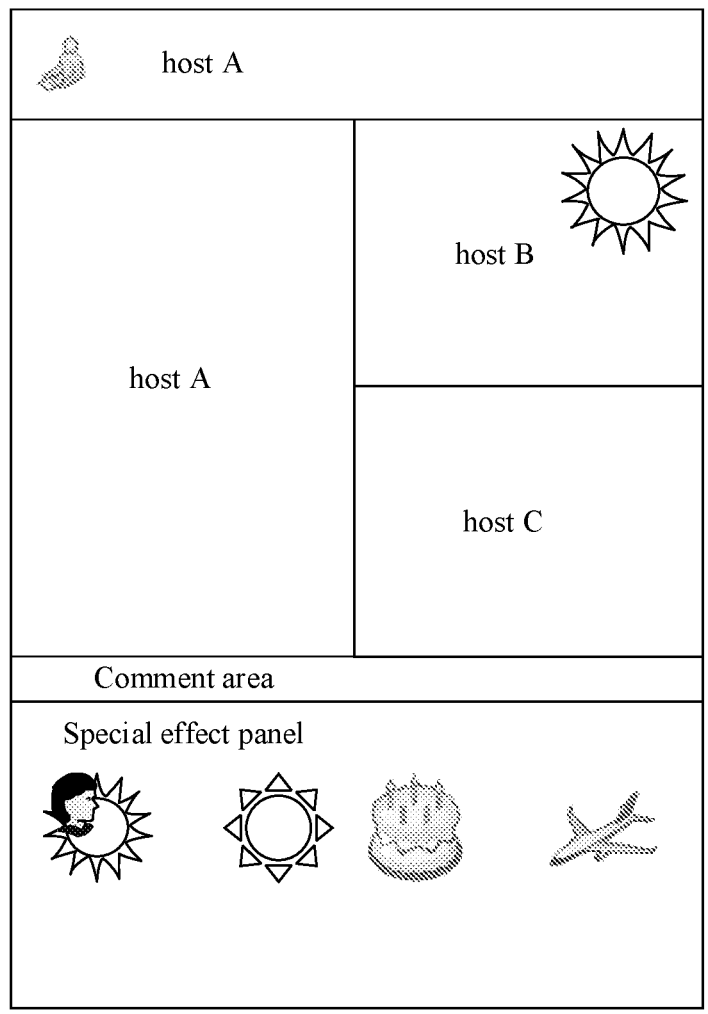
FIG. 3c is a schematic diagram of displaying a user identification on a special effect panel provided according to an embodiment of the present disclosure.

In order to enable the first user to intuitively know which users in the live streaming room are using a special effect image associated with a special effect identification displayed on the special effect panel, a user identification of the second user may also be displayed on the first special effect identification displayed on the special effect panel. For example, as shown in FIG. 3c, host A calls up the special effect panel by triggering the first special effect identification displayed on the live streaming room interface. The first special effect identification is displayed on the special effect panel, and an avatar of host B is displayed on the first special effect identification.

In some embodiments, in a case that the live streaming room interface further includes a third display image corresponding to a third user and the third display image is provided with the first special effect image, the method further includes: displaying the user identification of the third user on the first special effect identification displayed on the special effect panel. That is, in a case that other users in the live streaming room also use the first special effect image, user identifications of all users using the first special effect image are displayed on the first special effect identification displayed on the special effect panel.

Figure 4A:
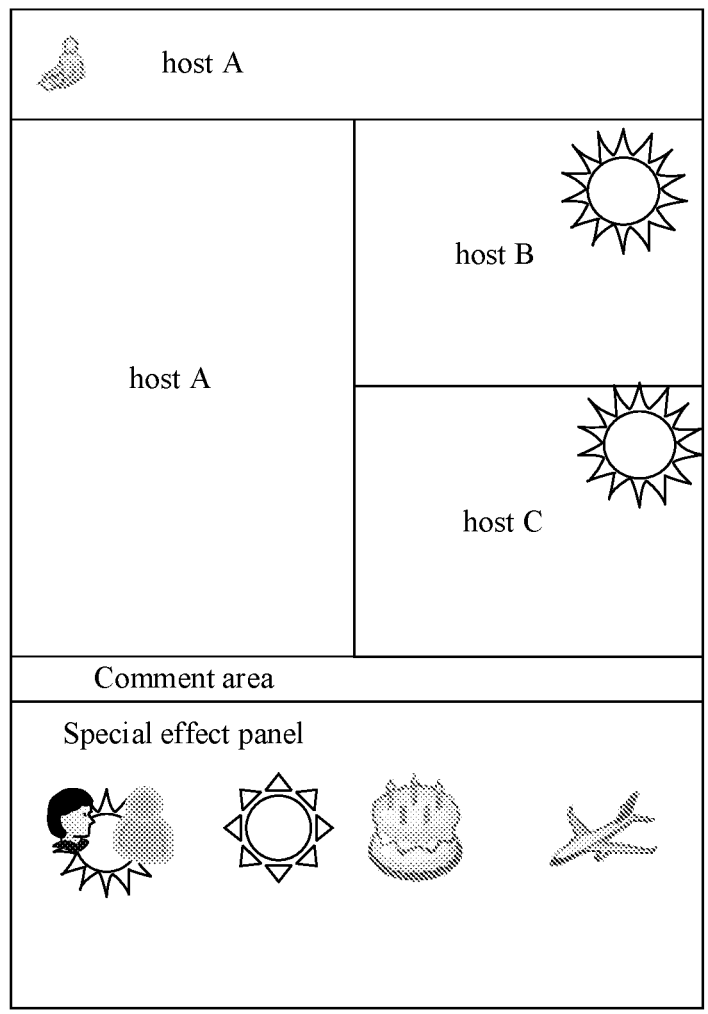
FIG. 4a is a schematic diagram of displaying two user identifications on a special effect panel provided according to an embodiment of the present disclosure.

In a case that the user identification of the second user and the user identification of the third user are displayed on the first special effect identification, the user identification of the second user and the user identification of the third user may be displayed on different positions of the first special effect identification. The display positions of the two user identifications do not overlap. For example, as shown in FIG. 4a, the avatar of host B is displayed in the upper left corner of the first special effect identification, and the avatar of host C is displayed in the upper right corner of the first special effect identification. Display areas for the two avatars do not overlap. In a case that the user identifications of different users are displayed at different positions of the first special effect identification, a display position of each of the user identifications may be determined based on a start time when a user starts using the first special effect image, and then the user identification of the user is displayed at the display position. That is, a correspondence relationship between different start times and display positions may be set in advance, and then a matching display position may be determined based on the correspondence relationship. For example, a user identification of a user who uses the first special effect image at the latest is displayed at the upper left corner of the first special effect identification, and a user identification of a user who uses the first special effect image at the earliest is displayed at the lower right corner of the first special effect identification.

In addition, the threshold for the number of the user identifications to be displayed may be set in advance. In a case that the number of users using the first special effect image is greater than the threshold, users in the number equal to the threshold are determined in accordance with time sequence, and user identifications of these users, whose number is equal to the threshold, are displayed on the first special effect identification.

Figure 4B:
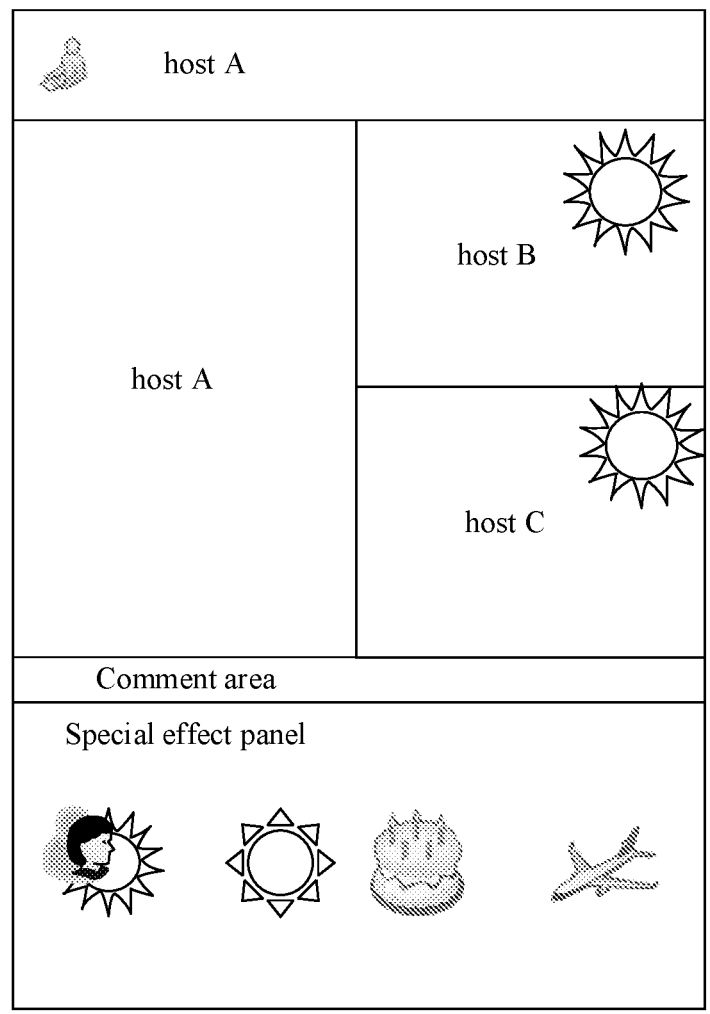
FIG. 4b is another schematic diagram of displaying two user identifications on a special effect panel provided according to an embodiment of the present disclosure.

In a case that the user identification of the second user and the user identification of the third user are displayed on the first special effect identification, the user identifications may alternatively be displayed by: displaying the user identification of the third user and the user identification of the second user on the first special effect identification in an overlapped manner. The display area occupied by the user identification of the second user on the first special effect identification and the display area occupied by the user identification of the third user on the first special effect identification are partially overlapped. Further, it is also possible to determine the position where the user identification of the third user overlaps with the user identification of the second user based on the time when the third user enables the first special effect image and the time when the second user enables the first special effect image. For example, if the time for the third user to enable the first special effect image is earlier than the time for the second user to enable the first special effect image, the user identification of the second user is displayed over the user identification of the third user in an overlapped manner. For example, as shown in FIG. 4b, the avatar of host B and the avatar of host C are displayed on the first special effect identification. Since the time when host C uses the first special effect image is earlier than the time when host B uses the first special effect image, the avatar of host B is displayed over the avatar of host C in a staggered manner.

In some embodiments, the method further includes: canceling the display of the first special effect identification on the live streaming room interface in response to the first user not triggering the first special effect identification within a first preset duration. That is, the duration allowed for the first special effect identification to be displayed on the live streaming room interface may be set in advance. After the displaying of the first special effect identification lasts for duration equal to the first preset duration, the display will be automatically canceled.

In some embodiments, in a case that the live streaming room interface further includes a fourth display image corresponding to a fourth user and the fourth display image is provided with a second special effect image, displaying the first special effect identification on the live streaming room interface includes: displaying, on the live streaming room interface, the first special effect identification and a second special effect identification associated with the second special effect image in an alternating manner. That is, in a case that multiple users except for the first user are using different special effect images in the live streaming room, the special effect identifications associated with different special effect images will be displayed in an alternating manner on the live streaming room interface of the first user, so as to provide the first user with a quick access to reuse each of the special effect images, improving the user experience. Alternatively, the first special effect identification and the second special effect identification are displayed on the live streaming room interface in an overlapped manner. In this way, the first special effect image and the second special effect image are displayed on the first display image in response to the triggering operation of the first user on the first special effect identification. That is, through one triggering operation, multiple special effect images may be added to the first display image, improving the convenience of adding multiple special effect images.

Alternatively, the special effect panel may be displayed in response to a click of the first user on the first special effect identification. The special effect panel is used to display multiple special effect identifications including the first special effect identification. The first special effect image displayed on the first display image is replaced with a third special effect image associated with the third special effect identification in response to a selection operation triggered by the first user on the third special effect identification displayed on the special effect panel. That is, in a case that the click operation of the first user on the first special effect identification is detected, the special effect panel is called up. Therefore, the special effect panel is quickly accessed, and the user can acquire a special effect image of interest more efficiently, improving the user experience.

In some embodiments, the live streaming room interface further includes a fifth display image corresponding to a fifth user, and the fifth display image is provided with a fourth special effect image. The method further includes: acquiring a first enabling time when a second host starts to use the first special effect image and a second enabling time when the fifth user starts to use the second special effect image; determining display positions of the first special effect identification and the fourth special effect identification on the special effect panel based on the first enabling time and the second enabling time; displaying the first special effect identification at the display position of the first special effect identification and displaying the fourth special effect identification at the display position of the fourth special effect identification. That is, the display position of the special effect identification on the special effect panel may be determined based on the time when each of the special effect images is enabled, and then the special effect identification is displayed on the corresponding display position. For example, the special effect identifications associated with the special effect images used by users are displayed in the sequence of being enabled from the latest to the earliest, so as to intuitively understand the time sequence of the use of special effect images. For example, if the time when host B starts using special effect 1 is earlier than the time when host C starts using special effect 2, special effect 2 is firstly displayed on the special effect panel and then special effect 1 is displayed on the special effect panel.

Furthermore, the fourth special effect identification may also be displayed on the live streaming room interface to provide the first user with an access to quickly reuse a fourth special effect image. For the fourth special effect identification and the related implementation of displaying the fourth special effect image on the first display image, please refer to the description of the first special effect identification in S201 to S203 above. This embodiment will not be repeated here.

Based on the embodiment of the method described above, a live video processing apparatus and a device are provided according to embodiments of the present disclosure. The apparatus and the device will be described below in conjunction with the accompanying drawings.

Figure 5:
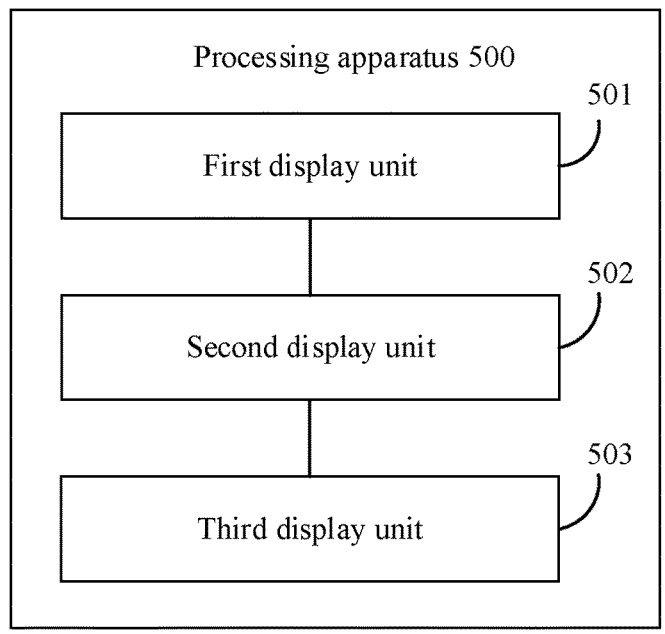
FIG. 5 is a schematic diagram of a live video processing device provided according to an embodiment of the present disclosure.

Referring to FIG. 5, FIG. 5 is a structural diagram of a live video processing apparatus according to an embodiment of the present disclosure. As shown in FIG. 5, the apparatus may include a first display unit 501, a second display unit 502, and a third display unit 503.

The first display unit 501 is configured to display a live streaming room interface, and the live streaming room interface includes a first display image corresponding to a first user and a second display image corresponding to a second user.

The second display unit 502 is configured to, in response to the second display image being provided with a first special effect, display, on the live streaming room interface, a first special effect identification associated with the first special effect image.

The third display unit 503 is configured to display the first special effect image on the first display image in response to a triggering operation of the first user on the first special effect identification.

In an embodiment of the present disclosure, the second display unit 502 is further configured to display a user identification of the second user on the first special effect identification displayed on the live streaming room interface.

In an embodiment of the present disclosure, the third display unit 503 is configured to display the first special effect image on the first display image in response to a click operation of the first user on the first special effect identification.

In an embodiment of the present disclosure, the third display unit 503 is configured to: display a special effect panel in response to the triggering operation of the first user on the first special effect identification, the special effect panel including the first special effect identification; display the first special effect image on the first display image in response to the triggering operation of the first user on the first special effect identification on the special effect panel.

In an embodiment of the present disclosure, the apparatus further includes: a fourth display unit.

The fourth display unit is configured to display the user identification of the second user on the first special effect identification displayed on the special effect panel.

In an embodiment of the present disclosure, the live streaming room interface further includes a third display image corresponding to a third user, and the third display image is provided with the first special effect image. The fourth display unit is further configured to display a user identification of the third user on the first special effect identification displayed on the special effect panel.

In an embodiment of the present disclosure, the fourth display unit is configured to display the user identification of the third user and the user identification of the second user on the first special effect identification in an overlapped manner where a display area occupied by the user identification of the second user on the first special effect identification partially overlaps a display area occupied by the user identification of the third user on the first special effect identification.

In an embodiment of the present disclosure, the live streaming room interface further includes a fourth display image corresponding to a fourth user, and the fourth display image is provided with a second special effect image. The second display unit 502 is configured to display, on the live streaming room interface, the first special effect identification and a second special effect identification associated with the second special effect image in an alternating manner.

In an embodiment of the present disclosure, in response to the click operation of the first user on the first special effect identification, the apparatus further includes a fifth display unit.

The fifth display unit is configured to display the special effect panel, the special effect panel displays multiple special effect identifications, and the multiple special effect identifications include the first special effect identification.

The third display unit 503 is further configured to replace the first special effect image displayed on the first display image with a third special effect image associated with a third special effect identification in response to a selection operation triggered by the first user on the third special effect identification displayed on the special effect panel.

In an embodiment of the present disclosure, the live streaming room interface further includes a fifth display image corresponding to a fifth user, and the fifth display image is provided with a fourth special effect image. The apparatus further includes: an acquisition unit, a determination unit, and a sixth display unit.

The acquisition unit is configured to acquire a first enabling time when the second user starts to use the first special effect image and a second enabling time when the fifth user starts to use the fourth special effect image.

The determining unit is configured to determine, based on the first enabling time and the second enabling time, a display position of the first special effect identification and a display position of the fourth special effect identification on the special effect panel.

The sixth display unit is configured to display the first special effect identification at the display position of the first special effect identification and the fourth special effect identification at the display position of the fourth special effect identification.

In an embodiment of the present disclosure, the live streaming room interface displays a first control. The second display unit 502 is configured to display the first special effect identification associated with the first special effect image on the first control in response to the second display image being provided with the first special effect image. The first control is configured to perform enhancement processing on the first display image.

In an embodiment of the present disclosure, the apparatus further includes a processing unit.

The processing unit is configured to cancel the display of the first special effect identification in the live streaming room interface in response to a first host not triggering the first special effect identification within a first preset duration.

It should be noted that, for the specific implementation of each of units in this embodiment, reference may be made to the relevant description in the embodiments of the method described above. The units in the embodiment of the present disclosure are divided exemplarily, which are divided only based on a logical function. There may be other division methods in practical application. In addition, all function units according to the embodiment of the present disclosure may be integrated into one processing unit, or may be a physically separate unit, or may be one unit that is integrated by two or more units. For example, in the above embodiment, a processing unit and a sending unit may be the same unit, or may be different units. The integrated units may be implemented in a form of hardware or in a form of a software functional unit.

Figure 6:
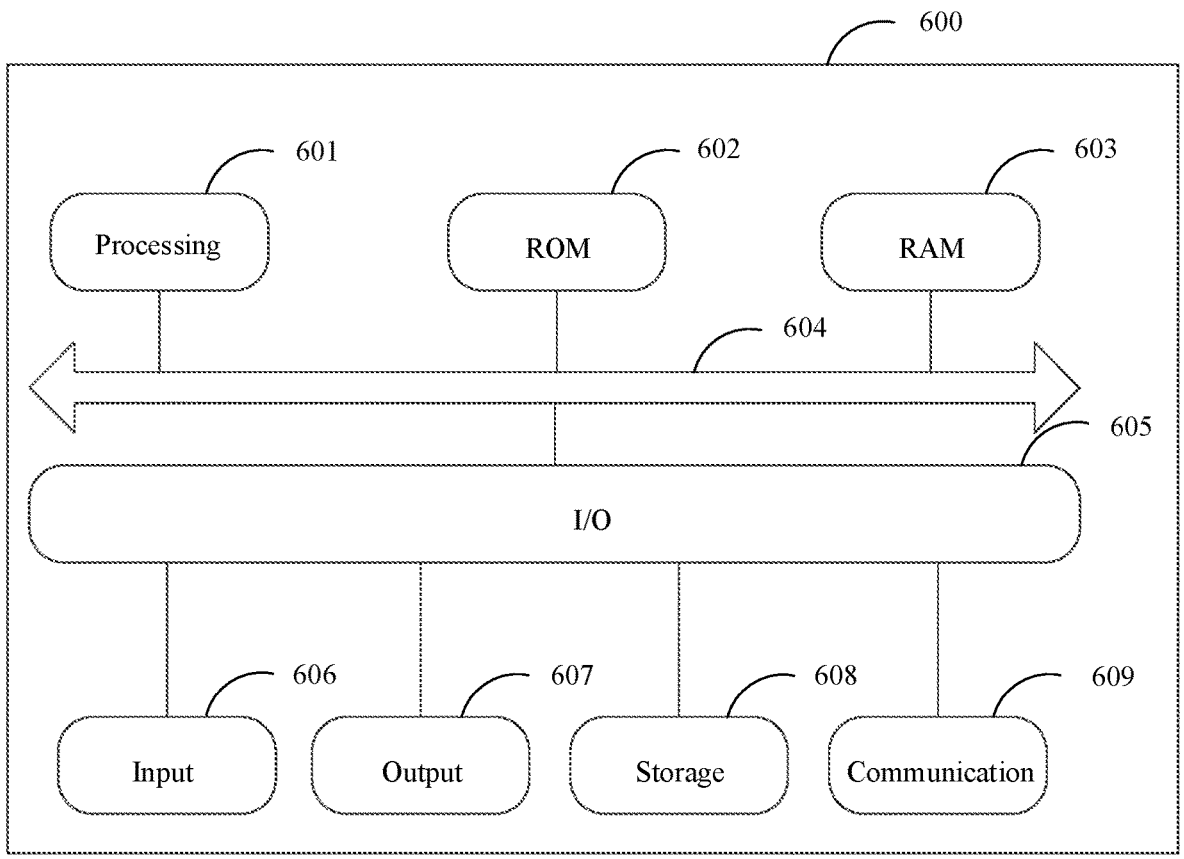
FIG. 6 is a structural diagram of an electronic device provided according to an embodiment of the present disclosure.

Referring to FIG. 6, FIG. 6 shows a structural diagram of an electronic device 600 suitable for implementing the embodiments of the present disclosure. The terminal device according to the embodiments of the present disclosure may include, but are not limited to, mobile terminals, such as mobile phones, laptops, digital broadcast receivers, PDAs (personal digital assistants), PADs (tablets), PMPs (portable multimedia players), vehicle-mounted terminals (such as in-vehicle navigation terminals), and fixed terminals such as digital TVs, desktop computers, etc. The electronic device shown in FIG. 6 is only exemplary, and should not put any limitation to the function and scope of application of the embodiments of the present disclosure.

As shown in FIG. 6, the electronic device 600 may include a processing apparatus 601, such as a central processing unit or a graphics processor, which may execute various operations and processing based on a program stored in a Read Only Memory (ROM) 602 or a program loaded from storage 608 into a Random Access Memory (RAM) 603. The RAM 603 is further configured to store various programs and data required by the electronic device 600. The processing apparatus 601, the ROM 602 and the RAM 603 are connected to each other through a bus 604. An Input/output (I/O) interface 605 is also connected to the bus 604.

Generally, the I/O interface 605 may be connected to: an input apparatus 606, such as a touch screen, a touch panel, a keyboard, a mouse, a camera, a microphone, an accelerometer, and a gyroscope; an output apparatus 607, such as a liquid crystal display (LCD), a speaker, and a vibrator; a storage apparatus 608 such as a magnetic tape and a hard disk; and a communication apparatus 609. The communication apparatus 609 enables wireless or wired communication between the electronic device 600 and other devices for data exchanging. Although FIG. 6 shows an electronic device 600 having various apparatus, it should be understood that the illustrated apparatus are not necessarily required to all be implemented or embodied. Alternatively, more or fewer apparatus may be implemented or included.

Particularly, according to an embodiment of the present disclosure, the process described above in conjunction with flowcharts may be implemented as a computer program. For example, a computer program product is further provided as an embodiment in the present disclosure, including a computer program carried on a non-transitory computer readable medium. The computer program includes program code for performing the method shown in the flowchart. In the embodiment, the computer program may be downloaded and installed from the network via the communication apparatus 609, or installed from the storage apparatus 608, or installed from the ROM 602. When the computer program is executed by the processing apparatus 601, the functions defined by the method according to the embodiment of the present disclosure are performed.

The electronic device according to the embodiments of the present disclosure and the method according to the above embodiment belong to the same inventive concept. For the technical details not described in detail in this embodiment, reference may be made to the embodiments described above. Moreover, this embodiment has the same beneficial effects as the embodiments described above.

A computer storage medium storing a computer program is provided according to the embodiment of the present disclosure. The program, when executed by a processor, performs the method according to the embodiments described above.

It is to be noted that, the computer readable medium mentioned herein may be a computer readable signal medium or a computer readable storage medium or any combination thereof. The computer readable storage medium may be but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read-only memory (ROM), an erasable programmable read-only memory (EPROM or a flash memory), an optical fiber, a portable compact disc read-only memory (CD-ROM), a light storage device, a magnetic storage device or any proper combination thereof. In the present disclosure, the computer readable storage medium may be any tangible medium containing or storing a program, and the program may be used by or in combination with an instruction execution system, apparatus, or device. In the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and can send, propagate or transmit programs to be used by or in combination with an instruction execution system, apparatus or device. The program codes stored in the computer readable medium may be transmitted via any proper medium including but not limited to: wire, optical cable, radio frequency and the like, or any proper combination thereof.

In some embodiments, a client and a server may communicate with each other using any currently known network protocol such as HTTP (Hyper Text Transfer Protocol) or a future developed network protocol, and may communicate and interconnect with digital data in any form or medium (for example, a communication network). Examples of a communication network include a local area network ("LAN"), a wide area network ("WAN"), the Internet Work (for example, the Internet), and a peer-to-peer network (for example, an ad hoc peer-to-peer network), as well as any currently known network or a future developed network.

The computer readable medium may be incorporated in the electronic device, or may exist alone without being assembled into the electronic device.

The computer-readable medium carries one or more programs. The one or more programs, when executed by the electronic device, cause the electronic device to implement the method described above.

Computer program codes for performing operations of the present disclosure may be written in one or more programming languages, including but not limited to object-oriented programming languages, such as Java, Smalltalk, and C++, and conventional procedural programming languages, such as the "C" language or similar programming languages. The program code may be executed entirely on a user computer, or partly on a user computer, or as a stand-alone software package, or partly on a user computer and partly on a remote computer, or entirely on a remote computer or server. In the case of using a remote computer, the remote computer may be connected to a user's computer through any kind of network, including a local area network (LAN) or a wide area network (WAN), or may be connected to an external computer (e.g., using Internet connection provided by an Internet service provider).

A Flowchart and a block chart in the drawings illustrate the architecture, functions and operations that can be implemented by the system, method and computer program product according to the embodiments of the present disclosure. Each block in a flowchart or a block chart may represent a module, a program segment, or a part of code, and part of the module, program segment, or part of code contains one or more executable instructions for implementing the specified logical function. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each of the blocks in the block chart and/or flowchart and a combination of the blocks in the block chart and/or flowchart may be implemented by a dedicated hardware-based system that performs specified functions or actions, or may be realized by a combination of dedicated hardware and computer instructions.

The units mentioned in the description of the embodiments of the present disclosure may be implemented by means of software, or otherwise by means of hardware. In some circumstances, name of a unit/module does not constitute a limitation on the unit itself.

The functions described above may be performed, at least in part, by one or more hardware logic components. By way of example but not for limitation, exemplary hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and the like.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. Machine-readable medium may include, but is not limited to, a system, an apparatuses, or a device in an electronic, magnetic, optical, electromagnetic, infrared, or semiconductor form, or any proper combination thereof. More specific examples of machine-readable storage medium include one or more wire-based electrical connections, a portable computer disk, a hard disk, a random access memory (RAM), a read only memory (ROM), an erasable programmable read only memory (EPROM or a flash memory), a fiber optic, a portable compact disk read only memory (CD-ROM), an optical storage device, a magnetic storage device, or any proper combination thereof.

It should be noted that embodiments in this specification are described in a progressive manner. Each embodiment focuses on differences from other embodiments, and reference may be made among these embodiments with respect to the same or similar parts. Since the system or the apparatus disclosed in the embodiments corresponds to the method disclosed in the embodiment, the description for the system or the apparatus is simple, and reference may be made to the embodiment of the method for the relevant parts.

It should be understood that in the present disclosure, the term "at least one" refers to a quantity equal to one or more, and the term "multiple" refers to a quantity equal to two or more. The term "and/or" are used to describe an association relationship between objects, and indicates three possible relationships. For example, "A and/or B" may indicate a case that there is only A, a case that there is only B, and a case that there are both A and B. In each case, a quantity of A may be one or more, and a quantity of B may be one or more. The symbol "/" generally indicates that a former object and a latter object are associated by an "or" relationship. The term "at least one of" or a similar expression refers to "any combination of", including any combination consisting of a single item or multiple items. For example, a statement "at least one of a, b, or c" may indicate a case of "only a", a case of "only b", a case of "only c", a case of "a and b", a case of "a and c", a case of "b and c", or a case of "both a, b and c", where a, b, and c may be single or multiple.

It should be noted that, the relationship terms such as "first", "second" and the like are only used herein to distinguish one entity or operation from another, rather than to necessitate or imply that an actual relationship or order exists between the entities or operations. Moreover, terms "comprising", "including", or any other variant thereof are intended to encompass a non-exclusive inclusion such that processes, methods, articles, or devices that include a series of elements include not only those elements but also those that are not explicitly listed or other elements that are inherent to such processes, methods, articles, or devices. Unless expressively limited otherwise, a statement of "comprising (including) one . . . " does not exclude a case that other similar elements exist in the process, method, article or device.

The steps of the method or algorithm described according to the embodiments disclosed herein may be implemented in forms of hardware, a software module executed by a processor or the combination of the both. The software module may be stored in a Random Access Memory (RAM), a memory, a Read-Only Memory (ROM), an electrical programmable ROM, an electrically erasable programmable ROM, a register, a hardware disk, a removable magnetic disk, a CD-ROM, or any other forms of storage medium well known in the art.

With the description of the embodiments disclosed above, those skilled in the art may implement or use technical solutions of the present disclosure. Various modifications to the embodiments are obvious to those skilled in the art, and general principles defined in the present disclosure may be implemented in other embodiments without departing from the spirit or scope of the present disclosure. Therefore, the present disclosure shall not be limited to the embodiments described herein but have the widest scope that complies with the principle and novelty disclosed in this specification.

The invention claimed is:

1. A live video processing method, comprising:
displaying a live streaming room interface, the live streaming room interface comprising a first display image corresponding to a first user and a second display image corresponding to a second user;
in response to the second display image being provided with a first special effect image, displaying, on the live streaming room interface, a first special effect identification associated with the first special effect image; and
displaying the first special effect image on the first display image in response to a triggering operation of the first user on the first special effect identification,
wherein the live streaming room interface further comprises a third display image corresponding to a third user, the third display image is provided with a third special effect image, and the method further comprises:
acquiring a first enabling time when the second user starts to use the first special effect image and a second enabling time when the third user starts to use the third special effect image;
determining, based on the first enabling time and the second enabling time, a display position of the first special effect identification and a display position of a third special effect identification on a special effect panel; and
displaying the first special effect identification at the display position of the first special effect identification and displaying the third special effect identification at the display position of the third special effect identification.

2. The method according to claim 1, wherein the method further comprises:
displaying a user identification of the second user on the first special effect identification displayed on the live streaming room interface.

3. The method according to claim 1, wherein the displaying the first special effect image on the first display image in response to the triggering operation of the first user on the first special effect identification comprises:
displaying the first special effect image on the first display image in response to a click operation of the first user on the first special effect identification.

4. The method according to claim 1, wherein the displaying the first special effect image on the first display image in response to the triggering operation of the first user on the first special effect identification comprises:
displaying the special effect panel in response to the triggering operation of the first user on the first special effect identification, the special effect panel including the first special effect identification;
displaying the first special effect image on the first display image in response to the triggering operation of the first user on the first special effect identification on the special effect panel.

5. The method according to claim 4, wherein the method further comprises:
displaying a user identification of the second user on the first special effect identification displayed on the special effect panel.

6. The method according to claim 5, wherein the third display image is provided with the first special effect image, and the method further comprises:
displaying a user identification of the third user on the first special effect identification displayed on the special effect panel.

7. The method according to claim 6, wherein the displaying a user identification of the third user on the first special effect identification displayed on the special effect panel includes:
displaying the user identification of the third user and the user identification of the second user on the first special effect identification in an overlapped manner where a display area occupied by the user identification of the second user on the first special effect identification partially overlaps with a display area occupied by the user identification of the third user on the first special effect identification.

8. The method according to claim 1, wherein the live streaming room interface further comprises a fourth display image corresponding to a fourth user, the fourth display image is provided with a second special effect image, and displaying the first special effect identification associated with the first special effect image on the live streaming room interface comprises:
displaying, on the live streaming room interface, the first special effect identification and a second special effect identification associated with the second special effect image in an alternating manner.

9. The method according to claim 1, wherein in response to a click operation of the first user on the first special effect identification, the method further comprises:
displaying the special effect panel, the special effect panel displaying a plurality of special effect identifications, and the plurality of special effect identifications comprise the first special effect identification;
in response to a selection operation triggered by the first user on the third special effect identification displayed on the special effect panel, replacing the first special effect image displayed on the first display image with the third special effect image associated with the third special effect identification.

10. The method according to claim 1, wherein the live streaming room interface displays a first control, wherein the first control is used to perform enhancement processing on the first display image, and the enhancement processing comprises at least one of retouching, filter and special effect processing, and the displaying, on the live streaming room interface, the first special effect identification associated with the first special effect image in response to the second display image being provided with the first special effect image comprises:

displaying the first special effect identification associated with the first special effect image on the first control in response to the second display image being provided with the first special effect image, the first control comprising an access to the special effect panel.

11. The method according to claim 1, wherein the method further comprises:

cancelling display of the first special effect identification on the live streaming room interface in response to a first host not triggering the first special effect identification within a first preset duration.

12. An electronic device, comprising a processor and a memory, wherein the memory is configured to store instructions or computer programs;

the processor is configured to execute the instructions or the computer programs in the memory to cause the electronic device to perform:

displaying a live streaming room interface, the live streaming room interface comprising a first display image corresponding to a first user and a second display image corresponding to a second user;

in response to the second display image being provided with a first special effect image, displaying, on the live streaming room interface, a first special effect identification associated with the first special effect image; and displaying the first special effect image on the first display image in response to a triggering operation of the first user on the first special effect identification, wherein the live streaming room interface further comprises a third display image corresponding to a third user, the third display image is provided with a third special effect image, and the instructions are executed to further perform:

acquiring a first enabling time when the second user starts to use the first special effect image and a second enabling time when the third user starts to use the third special effect image;

determining, based on the first enabling time and the second enabling time, a display position of the first special effect identification and a display position of a third special effect identification on a special effect panel; and displaying the first special effect identification at the display position of the first special effect identification and displaying the third special effect identification at the display position of the third special effect identification.

13. The electronic device according to claim 12, wherein the processor is further configured to execute the instructions or computer programs in the memory to cause the electronic device to perform:

displaying a user identification of the second user on the first special effect identification displayed on the live streaming room interface.

14. The electronic device according to claim 12, wherein the processor is further configured to execute the instructions or computer programs in the memory to cause the electronic device to perform:

displaying the first special effect image on the first display image in response to a click operation of the first user on the first special effect identification.

15. The electronic device according to claim 12, wherein the processor is further configured to execute the instructions or computer programs in the memory to cause the electronic device to perform:

displaying the special effect panel in response to the triggering operation of the first user on the first special effect identification, the special effect panel including the first special effect identification;

displaying the first special effect image on the first display image in response to the triggering operation of the first user on the first special effect identification on the special effect panel.

16. The electronic device according to claim 15, wherein the processor is further configured to execute the instructions or computer programs in the memory to cause the electronic device to perform:

displaying a user identification of the second user on the first special effect identification displayed on the special effect panel.

17. The electronic device according to claim 12, wherein the processor is further configured to execute the instructions or computer programs in the memory to cause the electronic device to perform:

in response to a click operation of the first user on the first special effect identification, displaying the special effect panel, the special effect panel displaying a plurality of special effect identifications, and the plurality of special effect identifications comprise the first special effect identification;

in response to a selection operation triggered by the first user on the third special effect identification displayed on the special effect panel, replacing the first special effect image displayed on the first display image with the third special effect image associated with the third special effect identification.

18. The electronic device according to claim 12, wherein the processor is further configured to execute the instructions or computer programs in the memory to cause the electronic device to perform:

cancelling display of the first special effect identification on the live streaming room interface in response to a first host not triggering the first special effect identification within a first preset duration.

19. A non-transitory computer-readable storage medium having instructions stored thereon, wherein the instructions, when being executed on a device, cause the device to perform:

displaying a live streaming room interface, the live streaming room interface comprising a first display image corresponding to a first user and a second display image corresponding to a second user;

in response to the second display image being provided with a first special effect image, displaying, on the live streaming room interface, a first special effect identification associated with the first special effect image; and displaying the first special effect image on the first display image in response to a triggering operation of the first user on the first special effect identification, wherein the live streaming room interface further comprises a third display image corresponding to a third user, the third display image is provided with a third special effect image, and the instructions further cause the device to perform:

acquiring a first enabling time when the second user starts to use the first special effect image and a second enabling time when the third user starts to use the third special effect image;

determining, based on the first enabling time and the second enabling time, a display position of the first special effect identification and a display position of a third special effect identification on a special effect panel; and displaying the first special effect identification at the display position of the first special effect identification and displaying the third special effect identification at the display position of the third special effect identification.

* * * * *